United States Patent [19]

Wine

[11] Patent Number: 4,554,582
[45] Date of Patent: Nov. 19, 1985

[54] APPARATUS FOR SYNCHRONIZING A SOURCE OF COMPUTER CONTROLLED VIDEO TO ANOTHER VIDEO SOURCE

[75] Inventor: Charles M. Wine, Mercer, N.J.

[73] Assignee: RCA Corporation, Princeton, N.J.

[21] Appl. No.: 528,229

[22] Filed: Aug. 31, 1983

[51] Int. Cl.⁴ .............................................. H04N 5/04
[52] U.S. Cl. .................................... 358/149; 358/148
[58] Field of Search ............... 358/149, 148, 150, 151, 358/153, 22, 319, 320, 337; 340/721, 725, 734, 814; 360/36.1, 36.2, 37.1

[56]   References Cited
U.S. PATENT DOCUMENTS

| | | | |
|---|---|---|---|
| 4,346,407 | 8/1982 | Baer et al. | 358/149 |
| 4,425,581 | 1/1984 | Schweppe et al. | 358/149 |
| 4,450,442 | 4/1984 | Tanaka | 340/721 |
| 4,464,679 | 8/1984 | WArgo | 358/149 |
| 4,498,103 | 2/1985 | Aschwanden | 358/149 |

Primary Examiner—John C. Martin
Assistant Examiner—David E. Harvey
Attorney, Agent, or Firm—P. J. Rasmussen; P. M. Emanuel; R. G. Coalter

[57]         ABSTRACT

Synchronization of a source of computer controlled video to a video disc player for interactive application is obtained by sensing when the computer vertical sync leads that of the player and gating out a number of computer clock pulses equaling one video line during a period of one or more video lines. Horizontal synchronization is disabled during the vertical acquisition mode and then is established by modulating the computer clock frequency with a line rate phase error signal obtained from both video sources thereby providing rapid synchronization within approximately two seconds under worst case conditions.

14 Claims, 10 Drawing Figures

APPARATUS FOR SYNCHRONIZING A SOURCE OF COMPUTER CONTROLLED VIDEO TO ANOTHER VIDEO SOURCE

FIELD OF THE INVENTION

This invention relates to video systems and particularly to video synchronizers.

BACKGROUND OF THE INVENTION

Video synchronizers are used in television studios, for example, for synchronizing various video sources (e.g., cameras, VTR's etc.) to a common standard studio timing signal source ("House Sync"). Commercial (broadcast quality) synchronizers (e.g., frame stores) are too costly, as a practical matter, for use in synchronizing consumer video products such as disc or tape players with other sources such as home computers or computer controlled video games. As is well known, such video sources do not generally provide video output signals which comply with NTSC standards as to line rates and color subcarrier frequency tolerances.

One approach to the problem of providing video synchronization of "consumer" video products is described in U.S. Pat. No. 4,346,407 entitled "APPARATUS FOR SYNCHRONIZATION OF A SOURCE OF COMPUTER CONTROLLED VIDEO TO ANOTHER VIDEO SOURCE" which issued to Baer et al. on Aug. 24, 1982. The Baer et al. system desirably avoids the use of relatively expensive frame or line stores. In the Baer et al. system, synchronization of a source of computer controllable video (e.g., a home computer or video game) to another video source (e.g., a disc or tape player) is achieved by providing clock pulses for the source of computer controlled video at some multiple of the horizontal synchronization frequency of the other video source to obtain frequency coherence and by detecting phase incoherence between the signals from the two sources and in response thereto causing the clock pulses to cease for a predetermined period to allow the source of computer controlled video to "slip" sync to obtain phase coherence.

The Baer et al. system achieves its general objective of locking computer generated video signals to the source of externally generated video without the use of conventional frame or line stores. This desirable benefit is not obtained, however, without certain sacrifices. In particular, Baer et al. states that one of the phase locked loop components of the exemplary system they propose requires up to 910 fields to achieve phase lock. This corresponds to a lock-up time of about 15 seconds.

SUMMARY OF THE INVENTION

The present invention resides in part in recognizing the need for a synchronizer having a lock-up time substantially less than 910 fields (15 sec.). The invention also resides in part to meeting the need for a synchronizer of simplified design for improved cost effectiveness and thus improved reliability.

A video synchronizer embodying the invention, for synchronizing a first source of computer controlled video signal to a second source video signal, comprises input means for connection to the video sources for receiving the video signals and output means for connection to the first video source for supplying clock pulses thereto. A phase detector means is coupled to the input means for receiving horizontal components of the video signals and developing an error signal. A controlled oscillator means is coupled to the output means for supplying the clock pulses thereto and responsive to the error signal for varying the clock pulse rate in a sense to synchronize the horizontal components of the video signals. A sequence detector means is coupled to the input means for producing a control signal having a duration substantially equal to an integer multiple of the duration of one horizontal line when the vertical component of the first source leads the vertical component of the second video source. A clock gating means is responsive to the control signal for effectively interrupting a predetermined number of cycles of the clock pulses when the control signal is present, the number of interrupted clock pulses being substantially independent of the integer multiple and the sum of the time duration of the interrupted clock cycles being substantially equal to one horizontal line for synchronizing the vertical component of the first source to that of the second source.

In accordance with a further aspect of the invention the integer multiple is a number, N, and the interrupted clock pulses correspond to one of each N clock pulses produced by the controllable oscillator means when the control signal is present.

DETAILED DESCRIPTION

Figure 1:
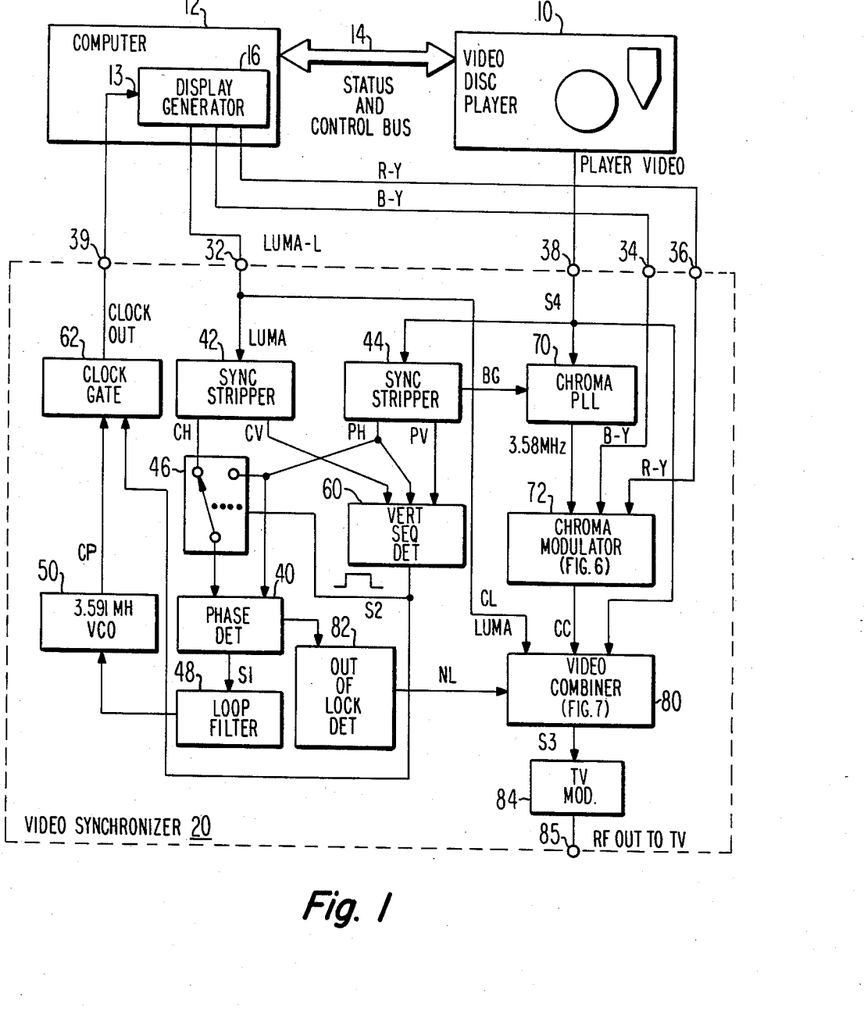
FIG. 1 is a block diagram of a computer controlled video disc player system having a video synchronizer embodying the invention.

The system of FIG. 1 provides interactive control of a video disc player 10 by means of a computer 12 which is coupled to player 10 via a bus 14. Bus 14 conveys computer status and program data information to computer 12 and conveys control data to player 10 for controlling various player operating modes (e.g., seek, scan, play, pause, etc.). Computer 12 may be a general purpose "home" or "personal" computer or a computer controlled "game" and includes a clocked display generator 16 for providing alphanumerics or graphic figures.

In this example of the invention, the video signal generated by display generator 16 in computer 12 is of component form comprising a luminance output signal L and two color difference signals R-Y and B-Y. Video disc player 10 may be of the optical or capacitance type, illustratively, and provides a player video output signal in composite form wherein the color components are quadrature amplitude modulated on a color subcarrier signal of NTSC standard frequency (about 3.58 MHz)

and added to the luminance signal component to form the composite player video signal.

The object is to combine the computer and player video signals to create a single video signal for display on a conventional TV receiver. The problem is that the player has its own autonomous time base and cannot be synchronized with external signals without heroic measures such as a full frame store. The mixing or superimposition of video signals requires exact synchronization. Video generating computers or computer games generally do not even generate a standard TV signal. Typically, the number of 3.58 MHz cycles in a line is not the NTSC value of 455/2 times the horizontal line frequency, and the number of scan lines in a frame is not 525.

In the embodiment of the system of FIG. 1, video synchronizer 20 (outlined in phantom) locks or synchronizes the computer generated video signal (Y, R-Y, B-Y) to the player video signal S4. Synchronizer 20 includes input means comprising terminals 32, 34, 36 and 38 for receiving the L, B-Y, R-Y and S4 signals, respectively, and an output means comprising a terminal 39 for supplying clock pulses to the clock input terminal 13 of display generator 16 in computer 12.

A phase detector 40 such as the CD 4046 integrated circuit available from RCA Solid State Division in Somerville, N.J. is coupled to the terminals 32 and 38 of the input means for receiving horizontal components of the video signals of computer 12 and player 10 and developing an error signal S1 representative of horizontal phase errors. Such a phase detector includes a lock detector that provides a signal indicative of phase lock or the absence thereof. The coupling is providing by means of two sync strippers 42 and 44 having inputs connected, respectively, to terminals 32 and 38. Stripper 42 receives the luma signal L from generator 16 and provides computer horizontal (CH) and computer vertical (CV) sync signals. Stripper 44 receives the player video signal S4 and provides player horizontal (PH) and player vertical (PV) sync signals. Signal PH is applied directly to one input of detector 40 and signal CH is applied via switch 40 to the other input of detector 40. Switch 46 is normally in the position shown when vertical sync is achieved but, as will be explained, is changed over to short the inputs of detector 40 while acquiring vertical sync to prevent transient disturbances of the error signal S1.

The error signal S1 is smoothed in a loop filter 48 having a bandwidth sufficiently wide (e.g., a few hundred Hertz) to allow the loop to track variations in the time base which might be produced by disc defects such as eccentricity. After smoothing, the error signal S1 is applied to a voltage controlled oscillator 50 which supplies clock pulses CP to the output means (terminal 39) for locking the horizontal line rate (CH) of generator 16 to the horizontal line rate (PH) of player 10.

Vertical synchronization is provided by means of a sequence detector 60 coupled to the input means via sync strippers 42 and 44. Specifically, detector 60 receives the computer vertical (CV), player vertical (PV) and player horizontal (PH) sync signals and produces a control signal S2 having a duration substantially equal to an integer multiple of one horizontal line when the vertical component CV of the computer leads the vertical component CV of the player.

A clock gate 62 is interposed in the VCO 50 output circuit and is responsive to signal S2 for effectively interrupting a predetermined number of cycles of the clock pulse when signal S2 is present for locking CV to PV. Signal S2 also shorts the inputs of phase detctor 40 by means of switch 46.

Two examples will be given to illustrate the vertical sync locking feature of the invention which occurs quite rapidly (e.g., within about two seconds as compared with the 15 second lock of the previously discussed system).

As a first example, assume that signal S2 has a time duration of 1-H. The center frequency of VCO 50 is set to 3.591 MHz when switch S2 is activated to short the inputs of detector 40. This frequency is slightly higher than the NTSC standard of 3.58 MHz. As a result computer display generator 16 has a slightly higher than normal vertical and horizontal rates. The specific clock frequency of 3.591 MHz is based on an assumed 60 Hz field rate for player 10, 228 clock cycles per horizontal line and 15,750 lines per second.

Vertical synchronization, in this example, is achieved by omitting 228 clock cycles (one lines worth) on any field for which the computer vertical sync occurs before the player vertical sync. For the assumed condition that signal S2 has a duration of 1-H, the omitted clock cycles are 228 consecutive cycles.

As a second example, the same overall effect can be achieved by letting the duration of signal S2 equal 2-H. In this case, alternate clock pulses are deleted for two lines but the total number of deleted pulses remains the same (228). The general relationships of the clock "line dropping" aspect of the invention (which provides rapid vertical lock) is that the number of interrupted clock pulses is substantially independent of the (integer) number of lines when signal S2 is present and the sum of the time duration of the interrupted clock cycles is substantially equal to one horizontal line. If, for example, S2 equals N lines, then the number of clock pulses dropped or inhibited corresponds to one of each N clock pulses when signal S2 is present. If N=1, then 228 consecutive pulses are dropped in one line. If N=2 then every other pulse is dropped for two lines for a total of 228 pulses.

A preferred value of N is 2 or more. The reason for this preference is that if N=2, for example, the effective clock frequency is reduced to only one-half its normal value. This is an advantage where generator 16 includes dynamic registers which have specific minimum clock rates and might loose data if a clock gap of 1-H were allowed to occur. Of course, this problem does not exist if generator 16 is fully static.

The speed at which vertical lock is attained is determined by the following factors: There are about 262 lines in a field. The display generator can be at most half a field or 131 lines from coincidence with the vertical phase of the player. Correction takes place at a rate of one scan line per field or 60 scan lines per second. Lock is thus attained in at most 131/60 seconds or 2.18 seconds.

Figure 2:
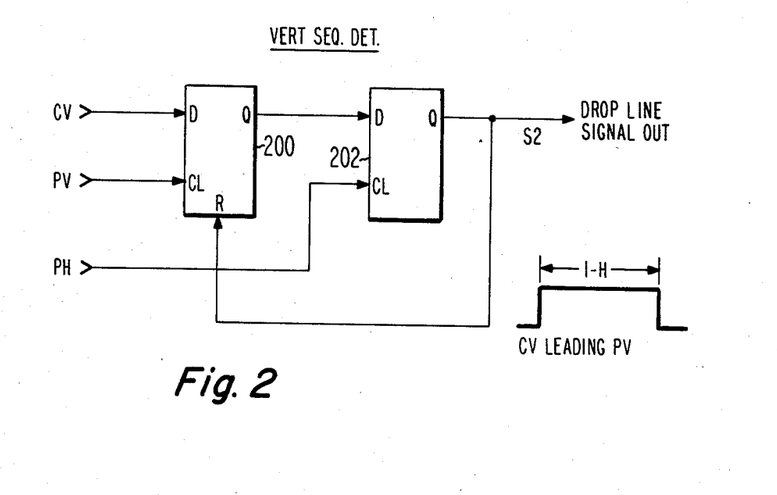
FIGS. 2 and 3 are logic diagrams of vertical sequence detectors suitable for use in video synchronizers embodying the invention.
Figure 3:
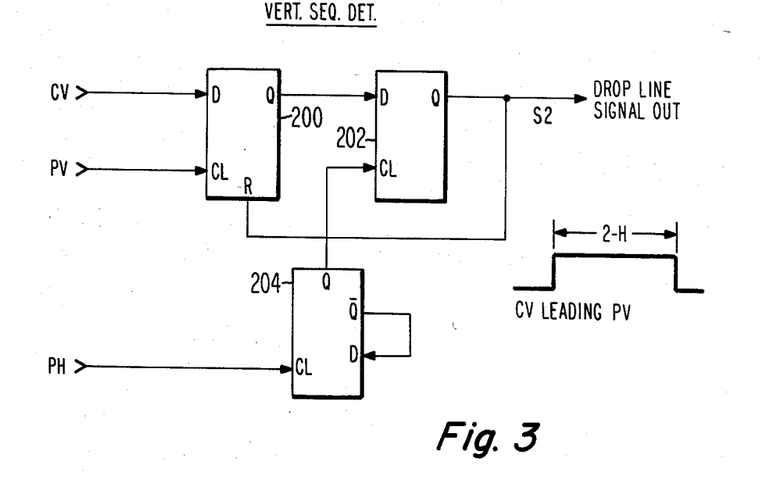

FIGS. 2 and 3 are exemplary of 1-H and 2-H vertical sequence detectors which may be used as detector 60 in synchronizer 20. In FIG. 2 flip flop 200 receives CV at its data input and PV at its clock input and therefore is SET whenever CV leads PV (positive logic convention assumed). Flip flop 202, when set, primes the data (D) input of flip flop 202 which is therefore SET upon the occurrence of the line rate signal PH. This generates the beginning of signal S2 which resets flip flop 200. Upon the beginning of the next line, D of flip flop 202 is low therefore flip flop 202 is reset exactly 1-H later. There is no change in the state of either flip flop if PV leads CV since all D inputs will be low.

FIG. 3 is similar to FIG. 2 but provides a 2-H duration for S2 when CV leads PV. This is achieved by means of flip flop 204 connected to divide the line rate signal PH by 2 prior to application thereof to the clock input of flip flop 202.

Figure 4:
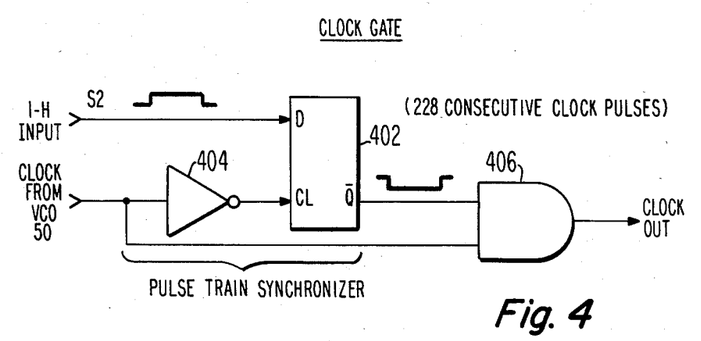
FIGS. 4 and 5 are logic diagrams of pulse dropping circuits suitable for use in video synchronizers embodying the invention.
Figure 5:
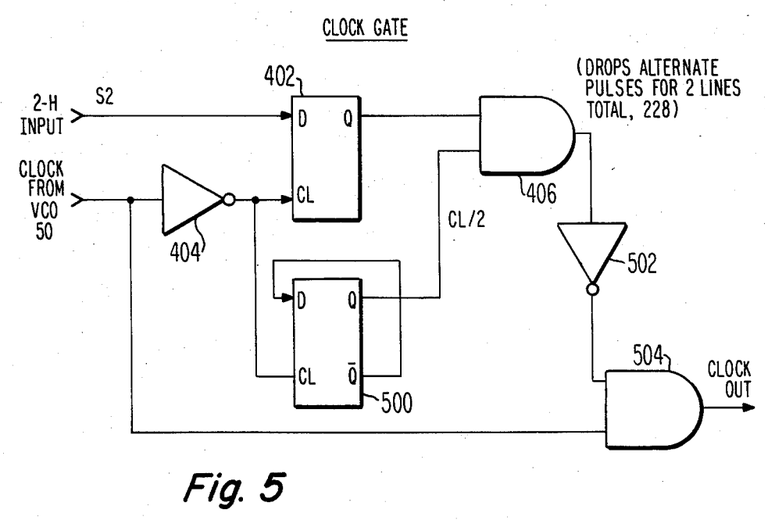

FIGS. 4 and 5 are exemplary of clock gates suitable for use with the sequence detectors of FIGS. 2 and 3, respectively, in the synchronizer of FIG. 1. The gate of FIG. 4 deletes 228 consecutive pulses during one line (1-H). Inverter 404 clocks flip flop 402 on the trailing edge of the clock pulses thereby synchronizing the S1 signal with the end of each clock pulse. The inverted Q output and clock pulses are applied to AND gate 406. Thus synchronized, the clock output pulses from gate 406 are always "whole" pulses, that is, the gated pulses are not truncated by signal S2 and so no spikes or partial pulses are sent to generator 16 thereby assuring reliable operation and freedom from noise spikes.

The clock gate of FIG. 5 is similar to that of FIG. 4 but is intended for use with a value of 2-H for signal S2. Elements 402, 404 and 406 operate as previously described except that divide by two flip flop 500 reduces the clock input to gate 406 by a factor of two. The output of gate 406 is inverted by inverter 502 and applied along with the clock pulses from VCO 50 to AND gate 504 whereby every other clock pulse is deleted when signal S2 is present.

Chroma processing in the synchronizer of FIG. 1 is provided by a chroma phase locked loop which receives a color burst gate (BG) signal from sync stripper 44 and the player video S4 signal from terminal 38. When signal BG is present the VCO in PLL 70 is locked to the player color subcarrier reference signal to provide a 3.58 MHz reference signal to chroma modulator 72 which also receives the baseband color difference signals R-Y and B-Y and provides a chroma output signal CC locked to the chroma component of the player composite video signal.

Figure 6:
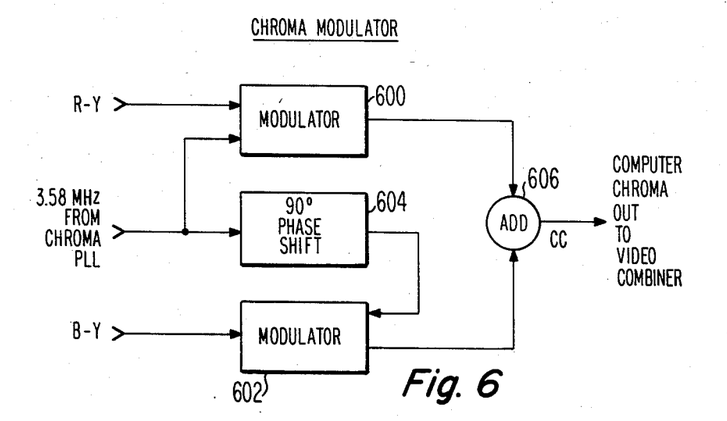
FIG. 6 is a block diagram of a chroma modulator suitable for use in the video synchronizer of FIG. 1.

FIG. 6 is exemplary of a circuit for locking the computer chroma to the player chroma reference frequency. The R-Y and B-Y signals are applied to modulators 600 and 602, respectively. Modulator 600 receives the 3.58 chroma reference which is applied to modulator 602 via a 90 degree phase shift circuit 604. The modulator outputs are summed in adder 606 to provide a quadrature amplitude modulated computer chroma signal CC at the player color subcarrier frequency and phase.

The final fully synchronized video output signal of the computer and disc player is formed by a video combiner 80 (FIG. 7) which receives an out of lock signal (NL, no lock) from an out of lock detector 82 coupled to phase detector 40 and also receives the computer luma signal CL, the computer chroma signal CC and the composite player video signal S4. These signals are all processed by combiner 80 to create a baseband signal S3 which is applied to a TV modulator 84 which provides an RF output signal on a selected TV channel at terminal 85 for display on a conventional TV receiver (not shown).

Figure 7:
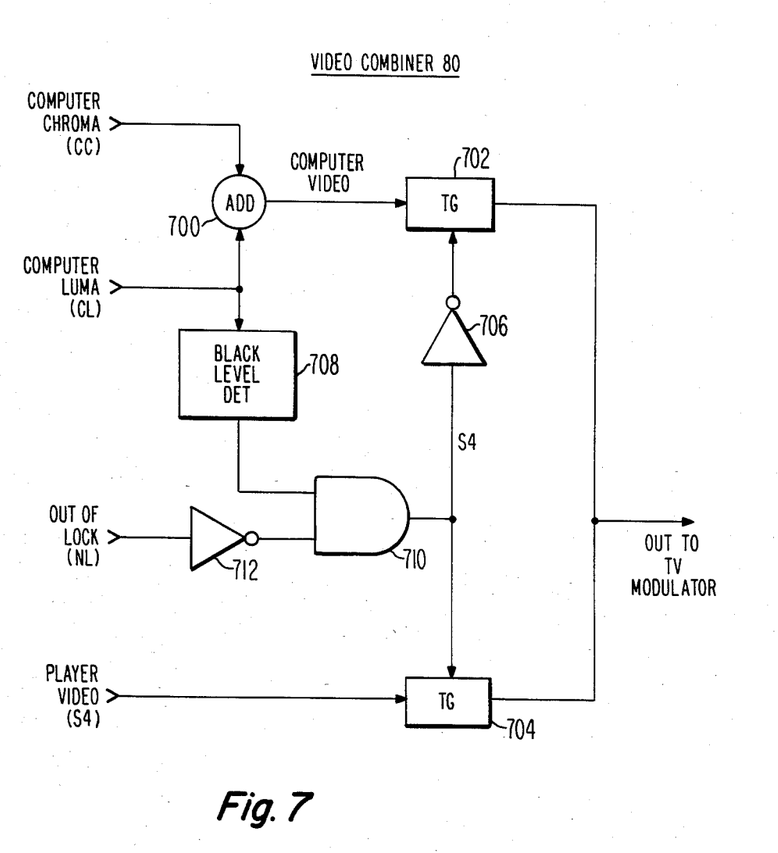
FIG. 7 is a logic diagram of a video combiner suitable for use in the synchronizer of FIG. 1.

Combiner 80 provides a number of functions and is specially designed to avoid sync signal distortion so as to preserve color fidelity (and in particular to avoid flesh tone distortion). It also utilizes the out of lock signal to automatically display only the computer output signal when the player is in a rapid search or pause mode when player video may not be available. A further feature is that the combiner provides computer video signals which are truly opaque as to the player video.

In combiner 80 the chroma CC and luma CL signals of the computer are summed in adder 700 to produce a composite computer video signal which is coupled via transmission gate 702 to the TV modulator when gate 702 is enabled. The player composite video signal S4 is coupled to the TV modulator via another transmission gate 704. Gates 702 and 704 are controlled by a control signal S4 which is applied directly to gate 704 and inverted by inverter 706 for controlling gate 702. Both of gates 702 and 704 are enabled by high level signals, accordingly,--; , gates 702 and 704 can never be simultaneously turned on so that their outputs may be connected directly together. This eliminates the need for adding the output signals in a summing circuit and also assures that the video signals applied to the TV modulator are "opaque" as to each other, that is, computer video will not "show through" the player video and vice versa.

The selection of computer or player video is provided by a black level detector 708 which enables an AND gate 710 when the computer luma signal is at black level and the computer video is locked to the player video. This latter feature is provided by inverter 712 which primes gate 710 when the lock detector indicates that the computer video is in lock (NL Low) and disables gate 710 whenever loss of lock occurs (NL high). Since only player video or computer video is outputted in this combiner, there is no addition or conflict between the color or synchronizing signals thus preventing color shifts or abnormally high sync levels. The video, in other words is always within its normal range of −40 to +100 IRE units.

Figure 8:
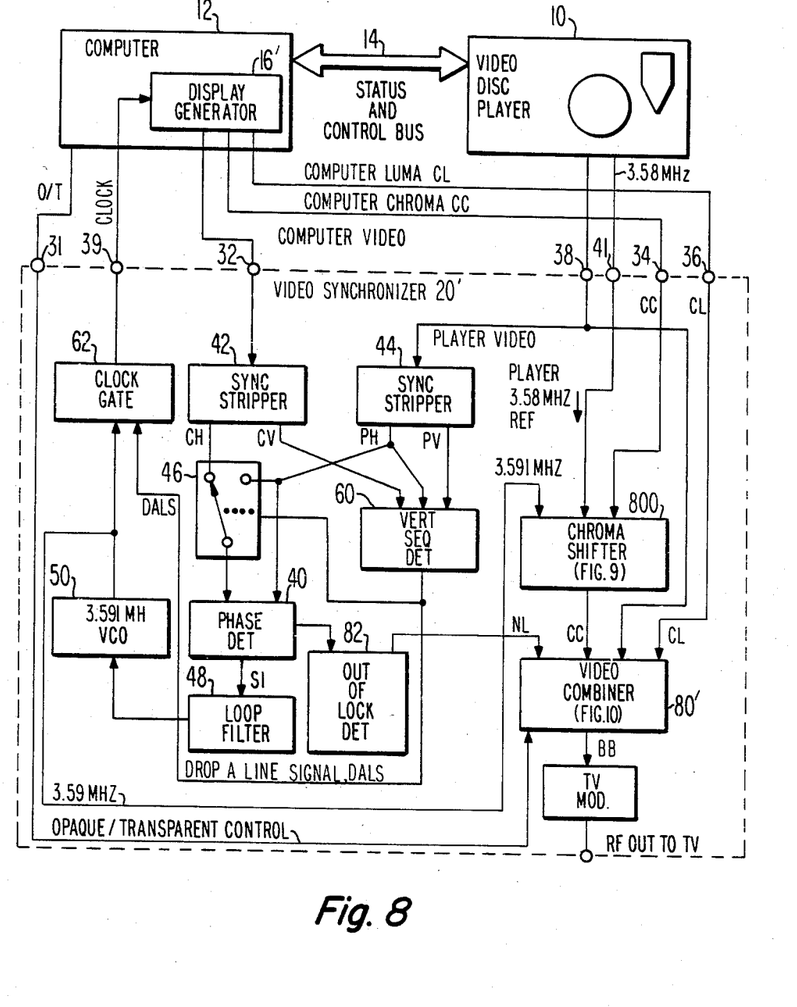
FIG. 8 illustrates certain modifications of the system of FIG. 1.

One change in the system illustrated in FIG. 8 is that the 3.58 MHz player color reference frequency signal has been obtained directly from the video disc player color processing circuits and applied to an added input terminal 41 of the video synchronizer 20'. This eliminates the need for the chroma PLL 70 which has been deleted.

Terminal 41 is coupled to an input of a "chroma shifter" 800 which also receives the 3.59 MHz VCO output signal and the computer chroma signal CC from terminal 34.

Figure 9:
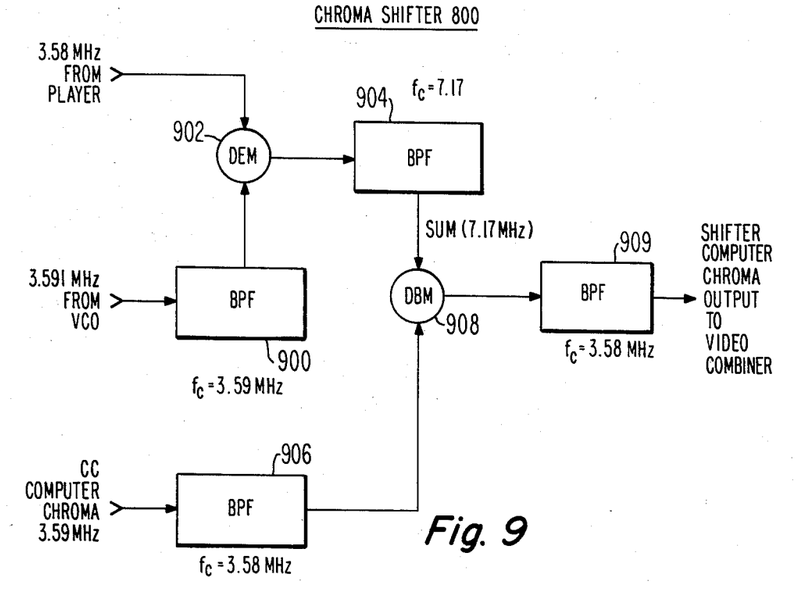
FIG. 9 is a block diagram of a chrominance signal shifter suitable for use in the system of FIG. 8.

Details of the chroma shifter are shown in FIG. 9. The purpose of the shifter is to frequency translate the computer chroma (3.59 MHz in the example) to the player chroma frequency and phase. Bandpass filter 900 removes harmonics from the VCO output (3.59 MHz) appearing in the computer chroma. A doubly balanced mixer 902 mixes the player carrier (3.58 MHz) with the filtered computer carrier (3.59 MHz). The resultant sum signal can be thought of as 3.58 MHz+3.59 MHz+Δ, where Δ is the amount by which the computer output chroma is in error and must be shifted.

Another bandpass filter 904 tuned to the sum frequency (7.17 MHz) eliminates the difference frequency and any unbalance output from the first mixer 902. The computer chrominance signal (CC) to be shifted is applied to a 3.58 MHz bandpass filter which removes the harmonics present in the digitally generated signal. This signal may be though of as a carrier and sidebands about that carrier where the carrier is 3.58 MHz+Δ.

A second doubly balanced mixer 908 combines the band limited chroma from filter 906 with the sum frequency from filter 904. Again, sum and difference signals are produced. It is the difference that is used. The difference is 3.58 MHz plus 3.58 MHz plus Δ minus 3.58 MHz minus Δ which equals 3.58 MHz, the desired NTSC standard. Bandpass filter 909 rejects the sum output to produce the desired shifted computer chrominance signal.

The system of FIG. 8 is similar to that of FIG. 1 but is intended for use with a computer 12 of the type having a display generator 16' which generates luminance, chrominance and composite video output signals. Also certain additional features have been added to the video combiner and the chroma processing has been changed.

In more detail, the computer composite video signal CV is applied to terminal 32, the player video signal PV is applied to terminal 38 and the clock signal at terminal 39 is applied to the display generator. Vertical and horizontal synchronization is provided by the same elements (42-60) as in FIG. 1 and so the description and operation thereof will not be repeated here.

A further feature of the system of FIG. 8 is the addition of an opaque/transparent option controlled by computer 12 (or by a suitable switch). This option allows the video combiner 80' to operate in the "opaque" mode of combiner 80 if desired or to assume a new mode where the player and computer video signals are "transparent" or both simultaneously displayed on the TV receiver. The effect is particularly interesting where colors are involved because new colors are created by the process of addition. It is very important in achieving this effect, which is more than simple addition, that the synchronizing signals not be added in order to obtain standard synchronizing levels.

Figure 10:
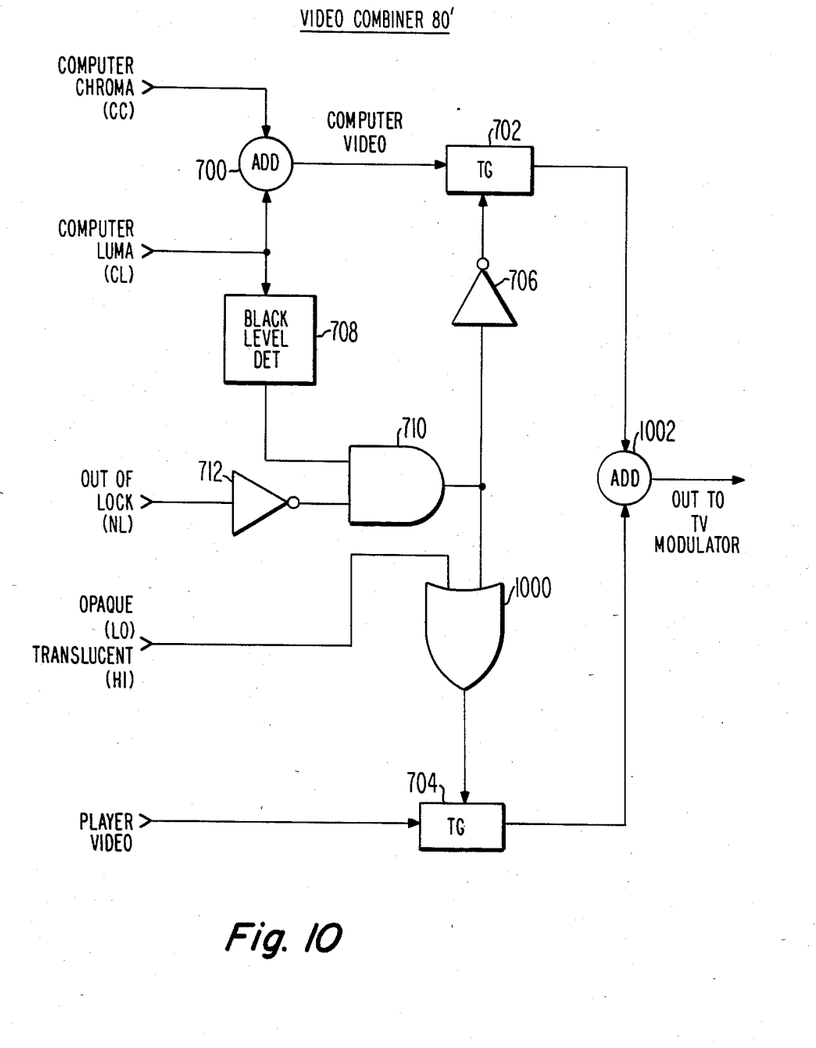
FIG. 10 is a block diagram of a video combiner suitable for use in the video synchronizer of FIG. 8.

In detail, the combiner of FIG. 10 is identical to that of FIG. 7 except for the inclusion of two further elements, namely, OR gate 1000 and adder 1002. When the opaque/translucent signal (terminal 31, FIG. 8) is low, gate 1000 may be ignored and the operation is the same as previously described for FIG. 7. However, when the O/T signal is high, gate 100 maintains transmission gate 704 continuously on. Since in this case both transmission gates can be on at the same time, added 1002 is present to prevent a short circuit and provides mixed active video to the TV modulator. Note that although the "active video" is mixed, the black level detector 708 disables gate 710 during synchronizing intervals of the computer video signal. Accordingly, in this mode synchronizing signals are provided only by the player video signal but the "active video" signals are summed from both sources. Accordingly, there cannot be a case where the sync signals mix which otherwise might lead to erratic triggering of the TV receivers sync circuits and distortion of the displayed images.

What is claimed is:

1. A video synchronizer for synchronizing a first source of computer controlled video signal to a second source of video signal, comprising:
   (a) input means for connection to said sources for receiving said video signals;
   (b) output means for connection to said first source for supplying clock pulses thereto;
   (c) phase detector means coupled to said input means for receiving horizontal synchronizing components of said video signals and developing an error signal;
   (d) controlled oscillator means coupled to said output means for supplying said clock pulses thereto and responsive to said error signal for varying the clock pulse rate to synchronize the horizontal synchronizing components of said video signals;
   (e) sequence detector means coupled to said input means for producing a control signal having a duration substantially equal to the duration of an integer multiple of one horizontal line when the vertical synchronizing component of said first source leads the vertical synchronizing component of said second video source; and
   (f) clock gating means responsive to said control signal for effectively interrupting a predetermined number of cycles of said clock pulses when said control signal is present, the number of interrupted clock pulses being substantially independent of said integer multiple and the sum of the time durations of the interrupted clock cycles being substantially equal to the duration of one horizontal line for synchronizing the vertical synchronizing component of said first source to that of said second source.

2. A video synchronizer as recited in claim 1 wherein said integer multiple is a number, N, and wherein the interrupted clock pulses correspond to one of each N clock pulses produced by said controllable oscillator means when said control signal is present.

3. A video synchronizer as recited in claim 2 wherein N equals one whereby consecutive clock pulses are interrupted for one line.

4. A video synchronizer as recited in claim 2 wherein N equals two whereby alternate clock pulses are interrupted for two lines.

5. A video synchronizer as recited in claim 2 wherein said integer multiple of said one horizontal line is an integer multiple of one horizontal line of said second video source.

6. A video synchronizer as recited in claim 1 further comprising means responsive to said control signal for effectively disabling said phase detector means when said control signal is present.

7. A video synchronizer as recited in claim 1 wherein said clock gating means includes pulse synchronizing means for preventing truncation of said pulses so that no fractional pulses pass through said clock gating means.

8. A video synchronizer as recited in claim 1 further comprising:
   chroma synchronizing means coupled to said input means for synchronizing a chrominance component of said first source with a chrominance component of said second source.

9. A video synchronizer as recited in claim 8 wherein said chroma synchronizing means comprises a plurality of mixers for effecting frequency and phase translation of said chrominance component of said first source.

10. A video synchronizer as recited in claim 8 wherein the chrominance component of said first source comprises at least two baseband components and wherein said chroma synchronizing means comprises a plurality of modulators for converting said baseband components to a quadrature amplitude modulated chrominance component having a subcarrier frequency equal to that of the chrominance component of said second source.

11. A video synchronizer as recited in claim 1 further comprising:
   combiner means including detector means coupled to said input means for detecting black levels of said video signal of said first source and switch means coupled to said detector means and to said input means for forming an output video signal representative of the video signal of said second source when the luminance level of the video signal of said first source is at black level and coupling said output video signal to an output terminal.

12. A video synchronizer as recited in claim 11 further comprising a loss of lock detector means coupled to said phase detector means for providing a loss of lock indicator signal and means for applying said indicator signal to said switch means for automatically coupling an output video signal representative of the video signal of said first source to said output terminal in response to predetermined levels of said indicator signal and a black level indicator signal provided by said black level detector.

13. A video synchronizer as recited in claim 12 wherein said combiner means further comprises circuit means coupled to said input means and to said output terminal of said combiner means
for simultaneously coupling both of said output video signals to said output terminal during the active period of a video line with the synchronizing portion of only a selected one of said output video signals being coupled to said output terminal.

14. A video synchronizer as recited in claim 1 further comprising:
combiner means including detector means coupled to said input means for detecting black level of said video signal of said first source and switch means coupled to said detector means and to said input means for simultaneously coupling the video signal of the second source and a video signal representative of the video signal of the first source to an output terminal when the luminance level of the video signal of said first source is not at black level.

* * * * *